United States Patent [19]
Chan

[11] Patent Number: 5,140,432
[45] Date of Patent: Aug. 18, 1992

[54] METHOD AND SYSTEM FOR PRINTING IN ONE OR MORE COLOR PLANES WITH IMPROVED CONTROL OF ERROR DIFFUSION

[75] Inventor: C. S. Chan, Bosie, Id.
[73] Assignee: Hewlett-Packard Company, Palo Alto, Calif.
[21] Appl. No.: 581,602
[22] Filed: Sep. 12, 1990
[51] Int. Cl.⁵ .................. H04N 1/21; H04N 1/23; H04N 1/40
[52] U.S. Cl. ........................... 358/298; 358/455; 358/458; 358/460
[58] Field of Search ............... 358/298, 455, 458, 460, 358/448, 296; 395/109

[56] References Cited
U.S. PATENT DOCUMENTS

| | | | |
|---|---|---|---|
| 4,924,322 | 5/1990 | Kurosawa | 358/448 |
| 4,969,052 | 11/1990 | Ishida | 358/296 |
| 5,051,844 | 9/1991 | Sullivan | 358/455 |

*Primary Examiner*—George H. Miller, Jr.
*Assistant Examiner*—Scott A. Rogers

[57] ABSTRACT

A pixel assignment and error diffusion system and method for gray scale printing in one or more color planes in the fields of ink jet printing, electrophotographic printing, or the like. The direction of each error diffusion with respect to the location of a just-scanned or just-processed super pixel within a larger scanned area is controlled by the contemporaneously developing gray scale profile and gradient over a previously scanned area defined by a predetermined number of previously scanned super pixels. This developing gray scale profile and gradient of a scanned image is used to select a matching error diffusion set of diffusion points, each having a relative weight W and a location L, from a chosen look-up table stored in memory. The relative weight W is proportional to the gray level intensity of the developing profile and the location L is proportional to the slope of the gradient of a family of gray level profile or contour lines, wherein the gradient is generally perpendicular to these lines. The selected error diffusion set is in turn used to control the direction and weighted distribution of an error remainder value R into areas of a processed image adjacent each just-scanned or just-processed super pixel within a larger scanned area.

13 Claims, 5 Drawing Sheets

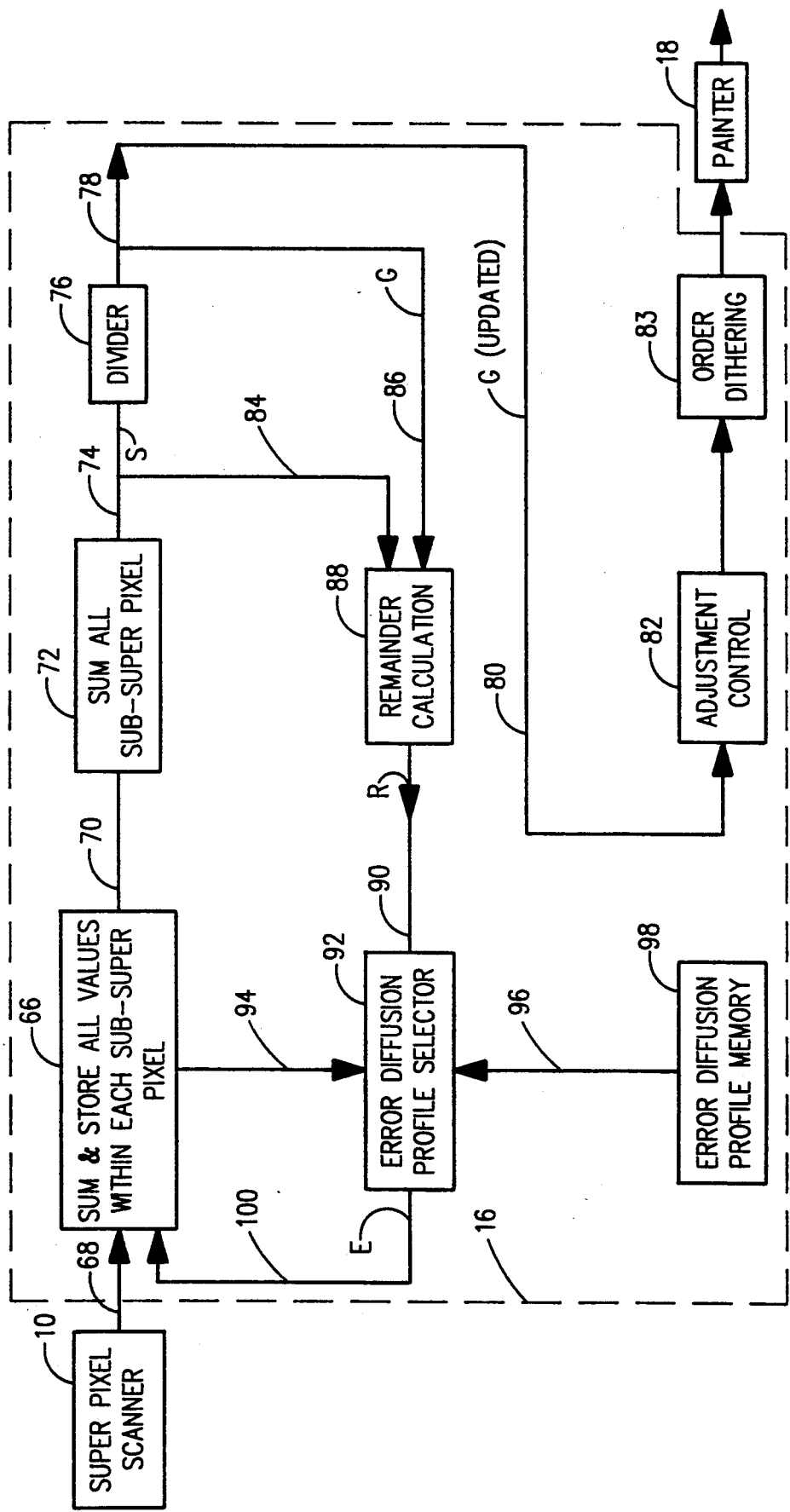

$L_1 < L_2 < L_3 < L_4$
$W_3 > W_2 > W_1 > W_4$

METHOD AND SYSTEM FOR PRINTING IN ONE OR MORE COLOR PLANES WITH IMPROVED CONTROL OF ERROR DIFFUSION

TECHNICAL FIELD

This invention relates generally to monochromatic and color printing in the fields of both ink jet printing and electrophotographic or laser printing. More particularly, this invention is directed to a novel pixel assignment and error diffusion and gray scale matching process useful for both ink jet and electrophotographic printing for improving the resolution and print quality of the hardcopy outputs generated by these printing methods.

BACKGROUND ART AND RELATED APPLICATIONS

In the above fields of monochromatic and color printing, gray scale printing techniques have been used wherein 256 levels of a complete gray scale have been subdivided into typically sixteen (16) or thirty-two (32) levels of a gray table. These subdivided gray levels have been used to control the printing of information of a scanned image into a plurality of pixels to form the reproduced image in one or more color planes. The remainder difference between a printable gray level value of a chosen gray table and the actual scanned pixel value of the image read by a scanner is error diffused into one or more pixels surrounding the just-scanned pixel or super pixel. These error diffusion processes have been described in various detail in my following identified co-pending applications and issued patent which are all assigned to the present assignee and are all incorporated herein by reference.

1. U.S. Pat. No. 4,930,018 issued May 2, 1990 is entitled "Method and System for Enhancing the Quality of Both Color and Black and White Images Produced by Ink Jet Printers".

2. U.S. patent application Ser. No. 353,859 filed May 17, 1989 is entitled "Method and System for Providing Closed Loop Color Control Between a Scanned Color Image and the Output of a Color Printer".

3. U.S. patent application Ser. No. 484,713 filed Feb. 26, 1990 is entitled "Method and System for Reproducing Monochromatic and Color Images Using Ordered Dither and Error Diffusion".

4. U.S. patent application Ser. No. 515,946 filed Apr. 27, 1990 is entitled "Method and System for Enhancing the Quality of Both Color and Black and White Images Produced by Ink Jet and Electrophotographic Printers".

All of my above identified co-pending patent applications disclose and claim new and useful improvements in the fields of both monochromatic and color printing and describe pixel assignment and error diffusion printing processes of the type in which the present invention will prove useful. The error diffusion processes described in these co-pending applications cite, among other things, the Floyd and Steinberg 4-point algorithm and the Stucke 12-point algorithm as being useful for controlling the dispersal of error diffusion into the neighboring pixels surrounding a just-scanned pixel or super pixel and corresponding to the error difference between a printable gray scale discrete level pixel value and the actual input image gray scale pixel data converted by a scanner. These algorithms are operative to control pixel assignment during the error diffusion process in such a manner as to predetermine the exact location of the pixels surrounding a just-scanned pixel or super pixel into which the above error remainder dots are diffused with fixed assigned weights.

DISCLOSURE OF INVENTION

The general purpose and principal object of this invention is to provide a novel and alternative approach and improved error diffusion process with respect to the above Floyd and Steinberg, Stucke and other prior art of error diffusion pixel assignment methods, such as those employing specific algorithms for assigning specific and fixed error remainder values to specific pixel locations. The novel method and system according to this invention is operative to closely match one of many stored sets of error diffusion points and defining a composite error diffusion profile to the profile or contour of the developing gray scale over a previously scanned number of pixels or super pixels which are defined herein as the "local area" surrounding a just-scanned super pixel.

As used herein, the terms "profile" and "contour" are applied synonymously to define both: (1) the developing gray level and gradient within a previously scanned area of a known size consisting of a predetermined number of pixels or super pixels, and (2) the different locations and relative weights of a set of error diffusion "points" into which an error remainder number of a just-scanned super pixel is subdivided. The term "gradient" as used herein is understood to mean the slope of the contour or profile lines of developing gray level in a direction orthogonal to these profile lines. Each error diffusion point within a "set" of points is defined by a location, L, and relative gray level weight, W, which taken together define the profile or contour of the particularly selected error diffusion set.

In accordance with another object of this invention and using this new error diffusion method, the error diffusion pixel assignment process is carried out in such a manner as to significantly enhance and improve the resolution of the scan converted and printed image and minimize the build up of "worms" in the image. This enhancement of resolution in turn improves the print quality of the hardcopy output from either a monochromatic or color printer.

Another object of this invention is to provide a new and improved image conversion, error diffusion, and color or monochromatic printing process of the type described wherein elegantly simple and straightforward data storage and data comparison signal processing may be employed to precisely control the overall error diffusion contour and gray level gradient of the printed error diffusion profile within an image being printed.

A further object of this invention is to provide a new and improved image conversion and printing process of the type described in which error diffusion is carried out at a very high computational efficiency.

A novel feature of this invention is the provision of an adaptive error diffusion process of the type described wherein the error diffused value equal to the remainder difference between a scanned image gray scale pixel value and a printable gray level value within a chosen gray table is distributed to super pixels surrounding a just-scanned or just-processed super pixel. This error remainder difference is distributed to the surrounding super pixels with a profile of error diffusion points having preselected locations and relative weights. These points define an error diffusion profile or contour which closely matches the contours of the gray scale contour within a local area of the super pixel presently being processed. This local area is made up of a predetermined number of previously scanned pixels or super pixels, and the size of this local area may be varied depending on pixel or sub-super pixel size and the above processed gray scale gradient.

Another feature of this invention is the provision of an image conversion and printing system of the type described which includes closed loop error diffusion control means including means for generating an error diffusion value, R, and means for subdividing R according to a selected set of error diffusion points having relative weights and locations defining an error diffusion profile or contour which closely matches the gray scale profile of a predetermined number of previously scanned pixels. The output information of each subdivided error diffusion set will define the number of locations and relative weights to be error diffused. The use of these preselected set of error diffusion points serves to increase the computational speed of the system as compared to the computation effort required for either the real time computation or "on the fly" computation and distribution of R based upon the actual values for the developing gray scale profile of the previously scanned super pixels. As used herein, the term "on the fly" computation refers to the fact that the scanning and computational pace or speed can be controlled other than in real time, wherein "real time" implies that the image conversion readout must keep pace with the image scanner.

Another feature of this invention is the provision of an adaptive error diffusion process of the type described which may be used with either ink jet or electrophotographic printing.

To accomplish the above purpose, objects and features as stated above, the method of the present invention operates prior to each error diffusion step to examine the scanned gray level values of a predetermined number of previously scanned super pixels developing within a scanned area to determine spatial gray scale profile which is developing in each of one or a plurality of color planes used to form the printed image. Accordingly, each error diffusion is distributed with a relative weight proportional to the relative gray level of the just-scanned local area and a diffusion length (location) which is inversely proportional to the gray level gradient within the local area. Thus, by diffusing the error remainder R in the direction of a changing gray scale profile developing in the image being scanned, the directionally weighted and controlled placement of the error diffusion will have the desired effect of improving the frequency response characteristics and overall resolution and print quality of the image converted to hardcopy output.

Generally speaking, the novel method in accordance with the present invention which may be used for printing in one or more color planes includes:

a. printing a dot loading into each of a plurality of pixels or super pixels equal to a discrete gray level value within a chosen gray table, b. generating an error remainder dot loading corresponding to the error remainder difference between a printable gray level value and input image pixel data converted by an image scanner or the like, and c. diffusing the error remainder dot loading into super pixels or pixels surrounding a just-scanned pixel or super pixel in paragraph a. above and in a direction determined by gray scale profile developing within an area defined by a predetermined number of previously scanned pixels or super pixels. In this manner, the contour of the error diffusion is continuously being adapted to match the continuously changing profile of the scanned image.

In accordance with a more specific claim of this invention, the present process is directed to a method for distributing the error remainder difference between a scan-converted image pixel value in one or more color planes and a printable gray level value corresponding to one of a plurality of levels of a chosen gray table. This process includes the steps of initially scanning a sequence of super pixels which make up a plurality of rows and columns within a given scanned area. All values within each super pixel are summed and stored in one stage of a signal processing system, and then all of the sub-super pixels are summed in another stage in order to generate a summed signal, S, a gray level output signal, G, and an error remainder signal, R. The value of R is equal to the difference between the scan converted image data in one or more color planes actually read by a scanner and the printable gray scale divided or quotient value, G, corresponding to one of a plurality of discrete levels of a gray table.

In accordance with a preferred embodiment of this invention, there is provided an error diffusion profile storage stage having a predetermined number of stored error diffusion profiles therein. Each profile contains a number of different available error diffusion output sets of error diffusion points, and with each set closely matched to the local previously scanned gray scale profile or contour. The output set of diffusion points will define the number of locations and relative weights of the error to be diffused.

The summed and stored values within each sub-super pixel previously scanned within a given larger super pixel are measured to thereby obtain the developing gray scale profile which is then matched in profile with the closest available set of error diffusion points. This is done in order to select a particular error diffusion set of points, E, which has the number of locations and relative weights most closely matched to the gray scale profile developing within the previously scanned local pixel area.

Then, the error diffusion set, E, obtained above is combined with the data previously summed and stored for all of the previously scanned pixels in each color plane, and the value E is distributed at a number of error diffusion locations and with relative weights and locations defined by the error diffusion set of points selected from an error diffusion profile storage stage. In this manner, the error diffusion E is distributed to super pixels surrounding a just-scanned super pixel with an error diffusion contour which is best matched to the gray scale contour or profile developing within the above defined local area.

The invention described below is claimed herein in both a method format and in a means-plus-function system format which defines a novel data processing system and signal processing methodology which may be used for the control of error diffusion in both electrophotographic and ink jet printers monochromatic and color printers.

Various other advantages and features of the present invention will become better understood with reference to the following description of the accompanying drawings.

BRIEF DESCRIPTION OF THE DRAWINGS

FIG. 3 is a functional block diagram showing the adaptive error diffusion system in accordance with the present invention and used for determining the number of locations and relative weights for the error remainder diffusion which is generated in the process of converting a scanned image to hardcopy output.

DESCRIPTION OF THE PREFERRED EMBODIMENT

Figure 1:
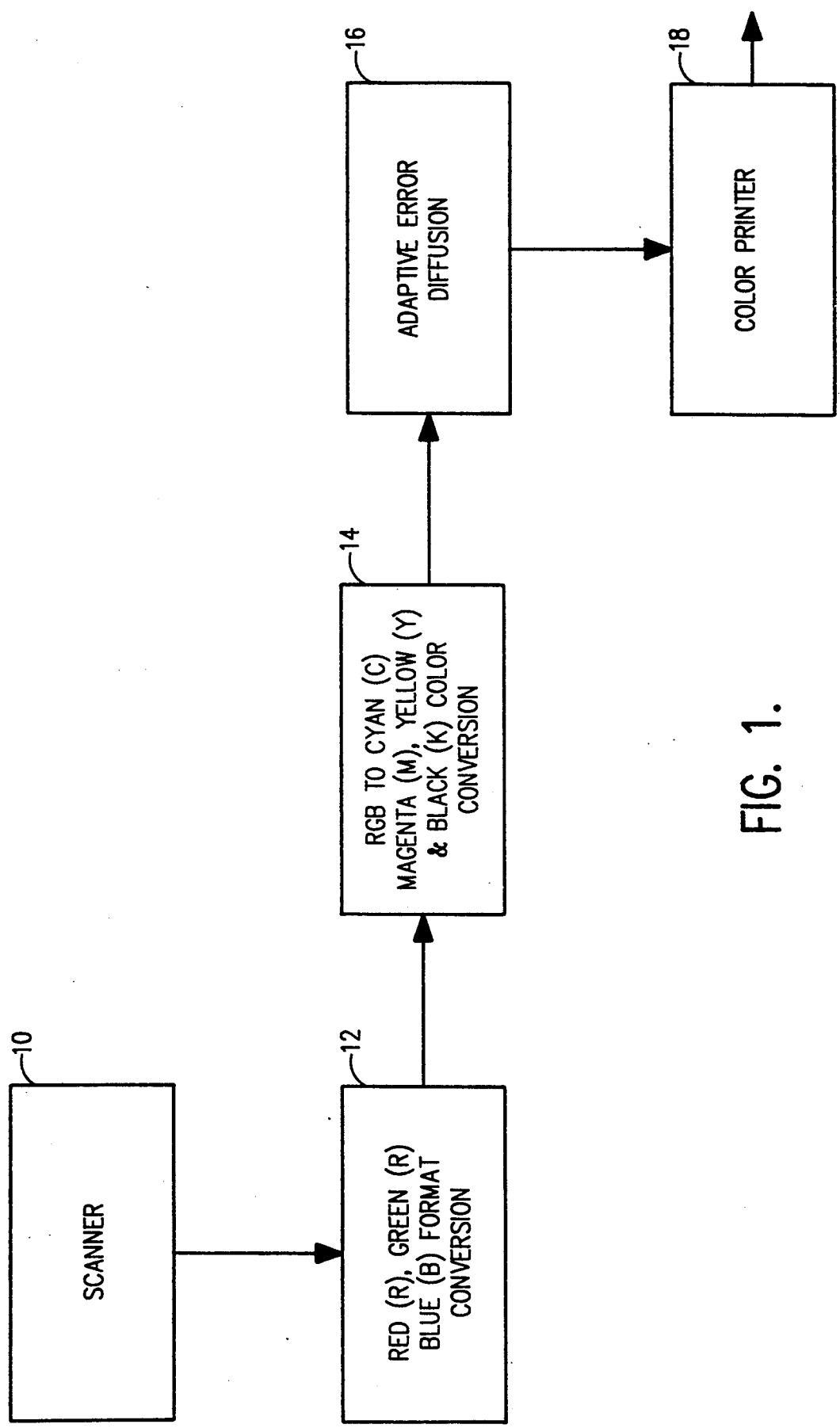
FIG. 1 is a functional block diagram showing the main functional stages of an electrophotographic or ink jet printer in which the present invention will be useful.

Referring now to FIG. 1, a typical electrophotographic or ink jet color printer will include an input scan conversion stage or scanner 10 which is connected to drive a red (R), green (G), and blue (B) format conversion stage 12 which in turn is connected to drive a cyan (C), magenta (M), yellow (Y), and black (K) color conversion stage 14. The output signal of the RGB to CMYK color conversion stage 14 is in turn connected to provide input data to an adaptive error diffusion stage or system 16 constructed in accordance with the teachings of the present invention. The output data from the adaptive error diffusion system 16 is in turn connected to drive a color ink jet or electrophotographic printer 18. For a further more detailed discussion of the connection and operation of the above described system combination of scanner 10, RGB format conversion stage 12, CMYK conversion stage 14 and color printer 18, reference may be made to any or all of my above identified co-pending applications or issued patent which describe the many aspects and general operation of these components of a color scan conversion and printing system.

Figure 2:
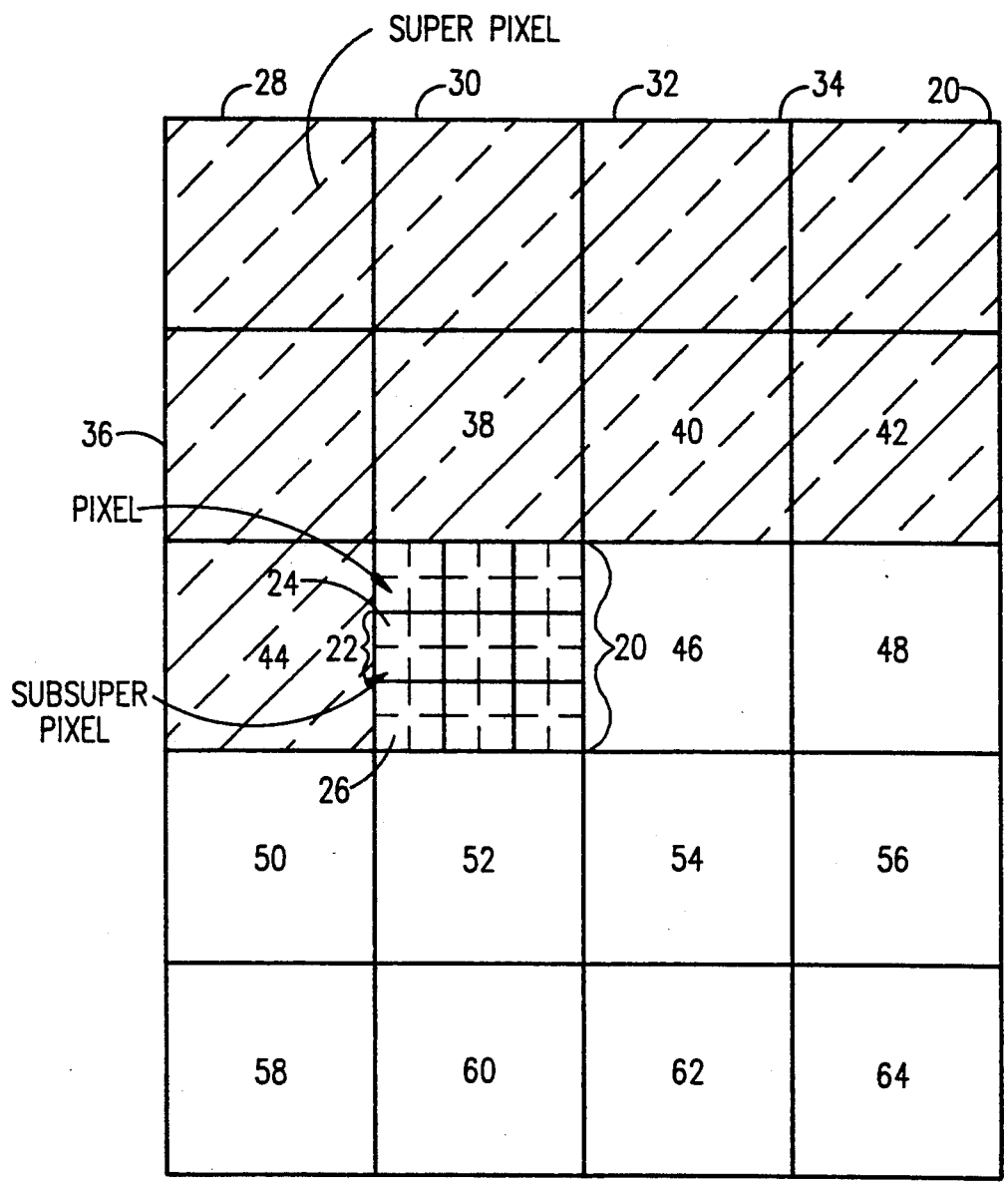
FIG. 2 is a plan view illustration of a number of super pixels made up of smaller sub-super pixels and then further subdivided into discrete pixels which together define a predetermined number of rows and columns of an area being read by an image conversion scanner.

Referring now to FIG. 2, an image area scanned by the scanner 10 may typically be made up of five (5) rows and four (4) columns of super pixels, and each super pixel 20 may for purposes of illustration be further subdivided into three (3) rows and three (3) columns of sub-super pixels 22. Each sub-super pixel 22 may in turn be subdivided into a two by two array of pixels 24, where a pixel is defined as the smallest addressable scan area. Thus, if the resolution of the scanner 10 is 300 dots per inch (dpi), then the width of a pixel is 1/300 inch.

In FIG. 2, the super pixel 22 represents the area most recently processed by the scanner 10, with the adjacent shaded super pixels representing the previously processed super pixels. The term "processed" as used herein to describe the pixel assignment and error diffusion process steps may include real time scanning by the scanner 10 or a combination of scanning and then subsequently storing the scanned information in memory, or it may also refer to the actual printing of the scanned image on hardcopy output or displaying the image on a CRT display or the like. Thus, the term "processed" means that both the gray level assignment value and the corresponding error diffusion values have already been determined by the signal and data processing system and method described herein. Thus, prior to processing the super pixel 20, the super pixels 28, 30, 32, 34, 36, 38, 40, 42, and 44 were previously processed in the left-to-right sequence shown, with the other super pixels 46, 48, 50, 52, 54, 56, 58, 60, 62, and 64 remaining to be scanned to complete the total scan area of the 4×5 super pixel scan matrix shown in FIG. 2.

In accordance with prior art error diffusion processes such as those developed by Stucke and by Floyd and Steinberg as described and referenced in detail in my above identified co-pending patent applications and issued U.S. Pat. No. 4,930,018, the error remainder diffusion, R, for a just-processed super pixel such as the area 20 would be made to the surrounding super pixels 46, 50, 52, and 54 in accordance with certain algorithms which would merely assign to these surrounding super pixels each either of value of zero or a predetermined integer value and subdivision of the error remainder value R developed in accordance with the above or certain other well used and understood algorithms. However, the error diffusion assignment dictated by these algorithms do not provide an overall error diffusion profile (or contour) and associated gray scale gradient which would optimize the resolution of the scan conversion and printing process and thereby optimize its print quality. As previously indicated, it is the particular solution to this problem and the optimization of this resolution and print quality to which the present invention is directed.

Referring now to FIG. 3, the adaptive error diffusion stage or system 16 is represented by the dotted lines surrounding the various components located between the input super pixel scanner stage 10 and the output color or monochromatic printer stage 18. The adaptive error diffusion system 16 includes an input summing and memory stage 66 which is connected to receive sub-super pixel data via one input 68 from the scanner 10 and is operative to sum and store all gray scale values within each sub-super pixel (22 in FIG. 2) within each larger super pixel 20. Output data from the summing and memory stage 26 is applied via line 70 as an input to a second summing stage 72 wherein all of the summed sub-super pixel information actually scanned by the scanner 10 is generated on output line 74 and applied to a divider stage 76. The divider stage 76 is operative to divide the summed output data, S, on line 74 into discrete gray table and gray level data, G, on line 78 which is applied as shown by way of an output line 80 to an adjustment control stage 82 to be described in further detail below. This gray level data, G, will, or example, be within one of the 16 or 32 subdivided levels of a gray table representing and digitizing the entire 256 levels of the well known gray scale.

The summed data, S, and the gray level data, G, are additionally applied respectively by way of lines 84 and 86 to a remainder calculation stage 88 where the absolute value of the error remainder signal, R, is generated on line 90 and is applied as one input line to an error diffusion profile comparator and selector stage 92. The profile comparator and selector stage 92 has two additional inputs 94 and 96 connected as shown respectively from the sum and store memory stage 66 and from an error diffusion profile storage stage (or look-up table -LUT stage) 98 which is operative for storing a plurality of different preselected error diffusion sets for controlling the distribution of the chosen error remainder entry data, E, into a plurality of super pixels in FIG. 2 adjacent to a just-processed super pixel 20. Thus, the gray scale gradient developing within each of a predetermined number of scanned sub-super pixels within a larger super pixel 20 is applied by way of line 94 to the profile comparator and selector stage 92 and compared therein with all of the available error diffusion sets within the error diffusion profile storage stage 98. This operation is preformed in order to select the error diffusion set of points with assigned weights and locations which is closest in matching contour to the developing super pixel data currently being summed and stored continuously in the sum and storage stage 66.

Thus, the particular error diffusion set in the look-up table 98 which best matches the gray scale profile of all sub-super pixels being scanned in the above defined local area is selected in the profile comparator and selector stage 92 as a means for generating the error diffusion data, E, for controlling the diffused locations and relative weights of the distributed error remainder signal, R. This signal R which passes through the profile comparator and selector stage 92 and is then applied by way of feedback connection 100 as a second input or error diffusion signal, E, to the sum and storage stage 66. The method and system described herein is operative at exceptionally high computational speeds as a result of being able to rely upon pre-stored error diffusion set data and not requiring that such data be continually generated in real time in exact proportion to the developing gray scale set of the image being scanned.

Thus, the data sum and storage stage 66 is continuously adding this modified error diffusion data, E, at high computational speeds to the just-scanned super pixel data, and R is now broken down and sub-divided into predetermined error diffused locations and assigned relative weights, with these adjacent super pixel error diffusion locations being determined with respect to the location of a just scanned super pixel.

Therefore, it will be readily appreciated that the gray level information, G, generated on line 78 in FIG. 3 and applied by way of line 80 to the adjustment control stage 88 is continuously updated for each scanned super pixel 20. In this manner, the total information G on line 80 contains both the divided gray level data (G) and a continuously updated directional and weighted error remainder data component, E. The continuously updated information, (G updated), applied to the adjustment control stage 82 is modified therein and subsequently applied to an order dithering output stage 84 connected as shown to drive either a color or monochromatic printer 18.

The optional adjustment control stage 82 is operative to ensure that the total dot count printed in a given super pixel area does not exceed a maximum allowable value for purposes of print quality control. The optional order dither stage 83 is used to control the pixel selection and pixel printing sequence for pixels or sub-super pixels 22 within a larger or super pixel 20 in order to optimize overall resolution and increase computational efficiency of the image conversion system. Order dithering operations of the type referred to above are generally well known in the electrophotographic and ink jet printing arts and are therefore not described in further detail herein. The control and operation of the adjustment control and ordered dithering stages 82 and 83 are, however, described in some detail in my above identified co-pending U.S. patent application Ser. No. 484,713 filed Feb. 26, 1990 which is incorporated herein by reference.

Figure 4A:
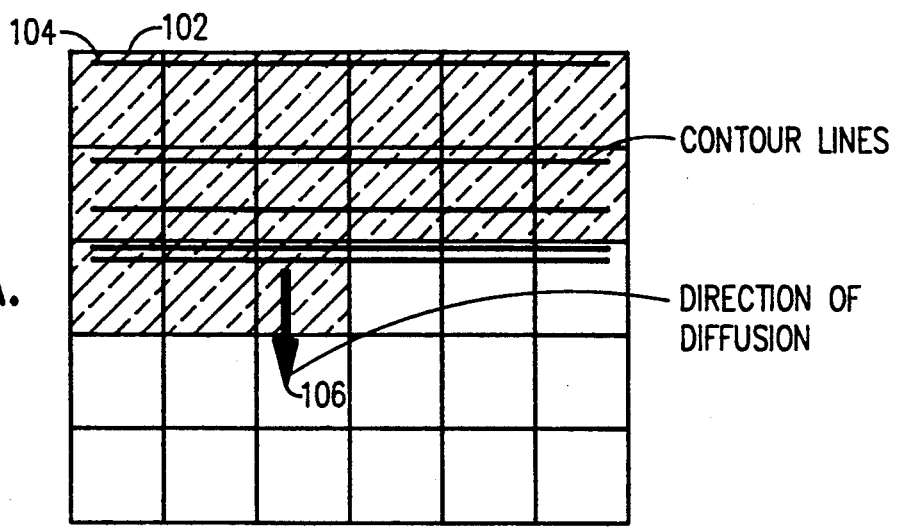
FIGS. 4A–4C are plan views illustrating the direction of error diffusions when the gray level gradient and contour lines are progressing in the vertical, horizontal, and diagonal directions, respectively.
Figure 4B:
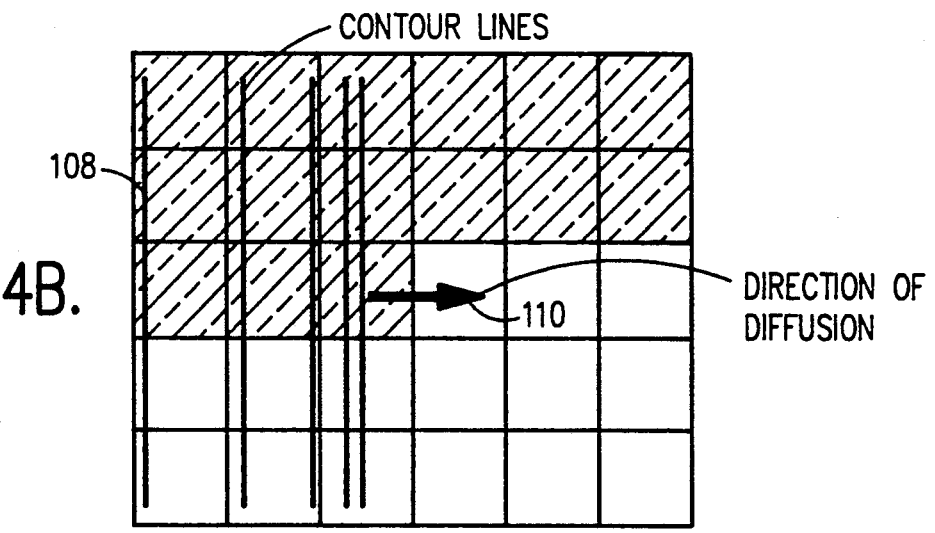
Figure 4C:
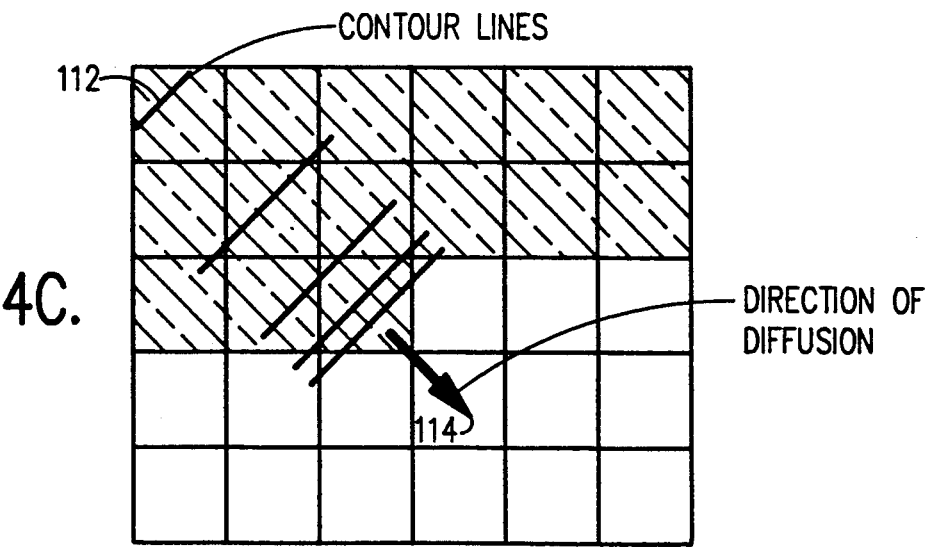

Referring now to FIGS. 4A-4C, there is shown in FIG. 4A a given scan area 102 in which the contour or gray level profile lines 104 become increasingly steep or concentrated proceeding in the vertical direction and down through the two and one-half rows of scanned super pixels. For this condition the gradient of the increasingly concentrated gray level contour lines 104 is in the orthogonal direction of the arrow 106, and therefore the direction of error diffusion should be made vertically in the direction of the gradient arrow 106.

Similarly, if the gradient as shown in FIG. 4B is progressing strictly in a horizontal direction as indicated by the gray level contour lines 108, then the direction of error diffusion should be in accordance with the horizontal direction of the arrow 110. In FIG. 4C, if the direction of the gray level contour in the scanned areas is proceeding in the diagonal direction as indicated by gray level contour lines 112, then the error diffusion should be made in the direction of the gradient arrow 114. However, these FIGS. 4A-4C are used merely to illustrate the directionality principle and concept utilized in carrying out the invention, and the gray level contour or profile lines such as those shown at 104, 108, and 112 in FIG. 4A-4C, respectively, of a scanned image are analogous to the topographical equal-elevation profiles extending across a map of landscape. That is to say, these elevation profiles on a plan view elevation map of a piece of landscape are analogous to the gray scale and gray level profiles within a given scanned area during an image conversion process. This topographical gray level contour is defined further below by the plurality of contour lines illustrated in FIGS. 5A and 5B herein.

Figure 5A:
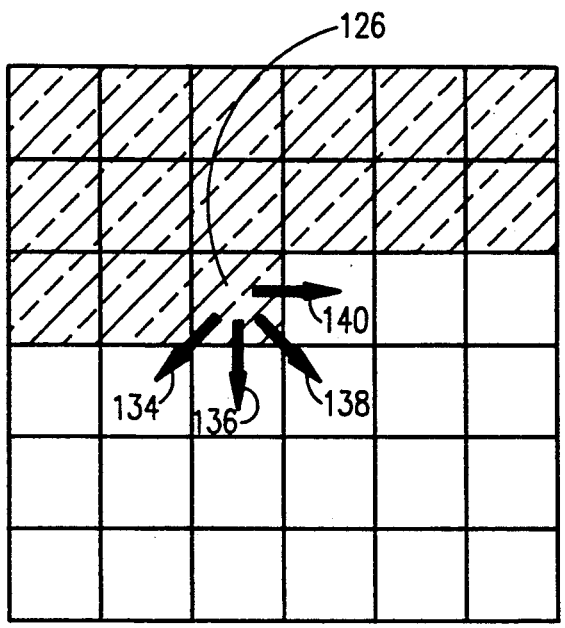
FIG. 5A is a plan view illustrating how an error diffusion profile would be made where the gray level profile of the previously scanned super pixels is developing with the adjacent and generally U-shaped family of gradient lines shown.

Referring first to FIG. 5A, the just-processed or just-scanned super pixel is identified by 126 and the adjacent shaded super pixels have previously been processed, whereas the white areas remain to be processed. Thus, the four (4) dark arrows, 134, 136, 138, and 140 represent four weights (W) and locations (L) of error diffusion to be made in accordance with the present invention.

Figure 5B:
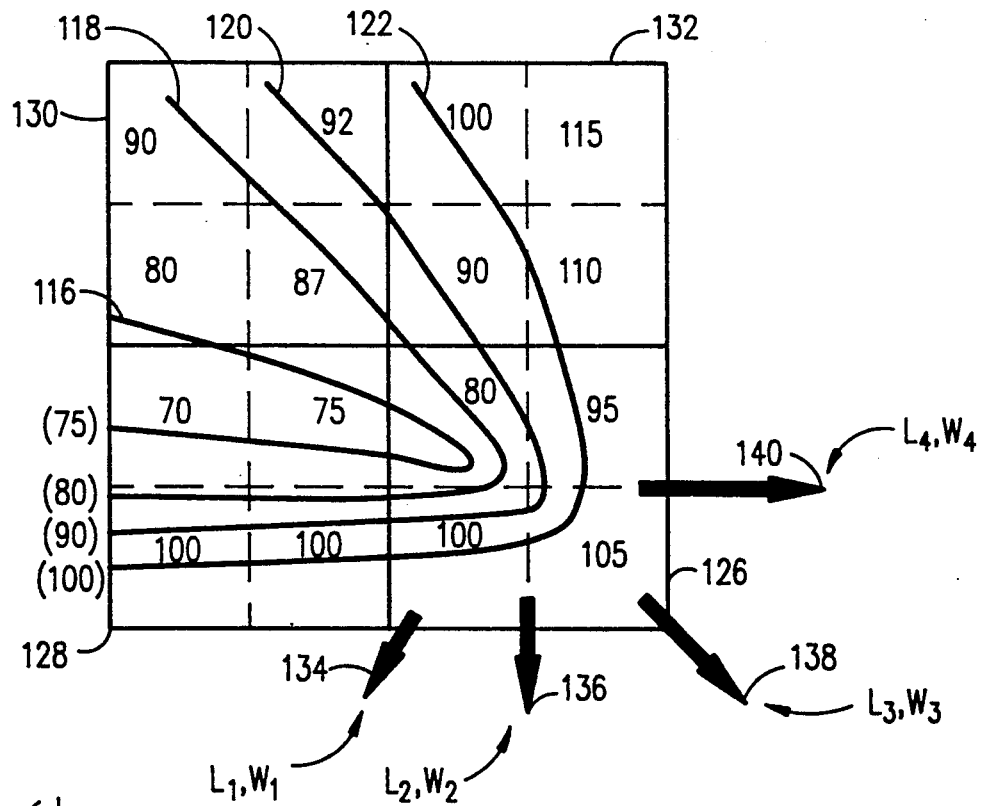
FIG. 5B is an enlarged view of the just-scanned super pixel in FIG. 4A and the three previously scanned super pixels closest thereto and defining a chosen "local" area for the purpose of describing the profile-matched error diffusion process according to the present invention.

Referring now to both FIGS. 5A and 5B, there are shown in FIG. 5B a plurality of contour lines 116, 118, 120, 122, and 124 which traverse over areas of the four adjacent super pixels 126, 128, 130, and 132 shown and have an equal gray level value. Examples of actual sub-super pixel gray level values are given in FIG. 5B for each sub-super pixel quadrant of each of four adjacent super pixels 126, 128, 130, and 132. Thus, reading from left to right in FIG. 5B, the five adjacent image contour lines 116, 118, 120, and 122 will have, respectively, gray level values increasing as indicated from 75 to 80 to 90, and then finally to the 100 gray level contour line on the right hand side of this figure. This progressing profile and gray level contour in FIG. 5B would for example cause to be generated four diffusion points 134, 136, 138, and 140 each having an associated location value $L_1$ through $L_4$, respectively, and an associated gray scale weighted value, $W_1$ through $W_4$, respectively. In the example given in FIG. 5B, $W_3$ is greater than $W_2$ is greater than $W_1$ is greater than $W_4$ and these relative weights correspond to the intensity or "elevation" levels of the family of gray level contour lines 116, 118, 120, 122 in FIG. 5B. Proceeding clockwise in FIG. 5B, the diffusion lengths which are determined by the gradients of this family of gray level contour lines are such that $L_4$ is greater (in length) than $L_3$ is greater than $L_2$ is greater than $L_1$.

Generally speaking, the slope of the gradient of the family of gray level contour lines 116, 118, 120, and 122 (and orthogonal thereto) is directly proportional to the diffusion length of the location value $L_1$ through $L_4$ away from a justprocessed super pixel. That is to say, the steeper the slope of this gradient, the shorter the diffusion length $L_1$ through $L_4$. Also, generally speaking, the weight $W_1$ through $W_4$ of the subdivided error diffusion number or fraction of R is directly proportional to the value of the gray level intensity of a given profile or contour line being developed. Therefore, the steeper the gradient orthogonal to the family of gray level contour lines, the shorter the diffusion length away from the just-processed super pixel the positions $L_1$ through $L_4$ will be spaced. And, the higher the gray level intensity (corresponding to elevation on a topographical map of landscape) of the developing family of gray level profile or contour lines over the previously processed area of interest, the greater the assigned weight $W_1$ through $W_4$ will be for each of the corresponding error diffusion locations $L_1$ through $L_4$.

It is also within the scope of this invention to distribute the error remainder in percentages defined by the relative weights $W_1$ through $W_4$ (where $W_1+W_2+W_3+W_4=1.0$) over and into more than one pixel. If, for example, $W_1=0.4$, $W_2=50$, $W_3=0.10$ and $W_4=0$ for a given grouping of relative weights, the 40% error remainder may be spread in the direction $L_1$ over several adjacent pixels, 50% of the error remainder may be spread in the direction $L_2$ over several adjacent pixels and 10% of the error remainder may be spread in the direction of $L_3$ over several adjacent pixels, and with the weight distribution being different for the adjacent pixels.

Various modifications may be made in and to the above described embodiment without departing from the spirit and scope of this invention. For example, there is no limitation or restrictive interpretation which attaches to the use of relative terms such as pixel, sub-super pixel and super pixel, since these terms are relative terms which are given by way of example only. In addition, the specifically illustrated closed loop control system in FIG. 3 for describing and carrying out the novel error distribution and diffusion process claimed herein is only one of several available image processing and conversion systems in which the present adaptive error diffusion method can be employed.

It is also within the scope of this invention to employ an error diffusion algorithm wherein either a fixed set of weights $W_1$ through $W_4$ may be used in combination a variable set of location values $L_1$ through $L_4$, or conversely, wherein a fixed set of location values $L_1$ through $L_4$ may be used in combination with a continuously variable set of error diffusion weights $W_1$ through $W_4$. In either case, merely by continuously varying either W or L but not both parameters at one time would still represent a significant improvement over the prior art error diffusion methods such as Stucke and Floyd and Steinberg where the W and L values are always both assigned to constant values in accordance with prescribed algorithms. Furthermore, by continuously updating only one or the other of the values of W and L, but not both simultaneously, the values computational efficiency of the above system and method can be significantly increased.

It is also within the scope of this invention to employ CRT type readout displays as well as producing a hard-copy output of the image being converted.

Accordingly, these and other obvious design and process modifications are within the scope of the following appended claims.

I claim:

1. A method for controlling error diffusion profiles during an image conversion process which comprises the steps of:
   a. storing a plurality of error diffusion sets in memory, with each error diffusion set being defined by a number of individual error diffusion points each assigned a relative gray level weight and location adjacent to a previously processed super pixel, and
   b. comparing the profile of the gray scale developing within a previously processed area of super pixels adjacent to said previously processed super pixel with said plurality of error diffusion sets, and thereby
   c. selecting for error diffusion the error diffusion set having an overall profile most closely matching said developing profile of said gray scale within a previously scanned area off an image adjacent to said previously processed super pixel.

2. A system for controlling error diffusion profiles during an image conversion process which includes, in combination:
   a. means for storing a plurality of error diffusion sets in memory, with each set being defined by a number of individual error diffusion points having assigned relative gray level weights and locations relative to the location of a previously processed super pixel, and
   b. means connected to said memory for comparing a developing gray scale profile within a number of previously processed super pixels adjacent a just-processed super pixel with said plurality of error diffusion sets for thereby selecting the error diffusion set having an overall composite profile most closely matching the contour and profile of said developing gray scale within said previously processed super pixels within a scanned image.

3. A method for diffusing an error remainder value, R, into selected print areas which includes the steps of:
   a. comparing a developing scanned image gray scale profile with a plurality of predefined error diffusion sets each having a number of available diffusion points corresponding to chosen assigned error diffusion locations and relative gray scale weights, and
   b. selecting for the error diffusion control of R the error diffusion set having the profile or contour which most closely matches said scanned image gray scale profile.

4. A system for diffusing an error remainder value, R, into selected print areas which includes the steps of:

a. means for comparing a developing scanned image gray scale profile with a plurality of predefined error diffusion sets each having a number of available diffusion points with assigned locations and relative gray scale weights, and b. means within or connected to said comparing means for selecting for the error diffusion control of R the error diffusion set having the profile or contour which most closely matches said scanned image gray scale profile.

5. A method for gray scale printing of gray level and error remainder data in one or more color planes to convert a scanned image to hardcopy output which comprises the steps of:

a. printing a dot loading into each of a plurality of super pixels equal to a discrete gray level value within levels of a chosen gray table, b. generating an error remainder dot loading corresponding to the error difference between said discrete gray level value and input image data converted by a scanner, and c. diffusing said error remainder dot loading into super pixels surrounding a just-scanned or just-processed super pixel in paragraph a. above and in a direction and with relative weights determined by the gray scale profile and gradient developing within an area defined by a predetermined number of previously printed super pixels, whereby the overall resolution of the converted image is enhanced.

6. The method according to claim 5 wherein the weight and directionality of said error diffusion is determined by comparing said gray scale profile to stored error diffusion data in a look-up table stored in memory.

7. The method according to claim 6 wherein the weight and directionality profile of said error diffusion is chosen from said look-up table stored in memory to match the gray scale profile developing in a preselected number of previously scanned or processed super pixels within a given scanned area of an image being converted.

8. A method for distributing the error remainder difference between a scan converted image in one or more color planes and a printable gray scale value corresponding to one of a plurality of levels of a selected gray table, comprising the steps of:

a. scanning a series of super pixels including sub-super pixels therein in sequence which make up a plurality of rows and columns defining a selected scanned area, b. summing and storing all values within scanned sub-super pixels defining each super pixel, c. summing and dividing all scanned sub-super pixel values within each super pixel to thereby generate a sum signal, S, and a gray level signal, G, and then processing said sum and gray level signals to generate an error remainder signal, R, d. providing in memory an error diffusion profile storage look-up table containing a predetermined number of error diffusion sets, with each set determining the location and relative weights for a number of error diffusion points, e. measuring the summed and stored values of each sub-super pixel previously scanned and processed during the row and column scanning of each larger super pixel to thereby obtain the gray scale profile developing for all previously summed sub-super pixels within a number of super pixels, f. comparing said gray scale profile in paragraph e. above with all of the available error diffusion sets in said look-up table to thereby select a particular error diffusion set having the number of diffusion point locations and relative weights which most closely match said gray scale profile developing in paragraph e. above, and g. combining the selected error diffusion set, E, obtained in paragraph f. above with the sub-super pixel data summed and stored in paragraph b. above.

9. A system for distributing the error remainder difference between a scan converted image in one or more color planes and a printable gray scale quotient value corresponding to one of a plurality of levels of a selected gray table, comprising:

a. means for scanning a series of sub-super pixels in sequence which make up and define a plurality of rows and columns of super pixels defining a chosen scanned area, b. means connected to said scanning means for summing and storing all scanned sub-super pixel values within each super pixel, c. means connected to said summing and storing means for summing and dividing all scanned sub-super pixel values to thereby generate a sum signal, S, and a gray level signal, G, and then processing said sum and gray level signals to generate an error remainder signal, R, d. means for providing an error diffusion profile storage look-up table containing a predetermined number of error diffusion sets, with each set having a number of points with each point being assigned a location and relative gray level weight for an error diffusion, e. means within said summing and storing means for measuring the summed and stored values of each sub-super pixel previously scanned and processed during the row and column scanning of a number of larger super pixels to thereby obtain the gray scale profile developing for all previously summed sub-super pixels, f. means connected to said measuring means and to said profile storage means and further connected to receive said error remainder signal, R, for comparing said gray scale profile in paragraph e. above with all of the available error diffusion sets in said look-up table to thereby select a particular error diffusion set having the number of locations and relative weights which most closely match the contour of said gray scale profile developing in paragraph e. above, and g. means connected between said comparing means and said summing and storing means for combining the error diffusion set, E, in paragraph f. above with the data summed and stored in paragraph b. above, whereby the use of said look-up table of error diffusion sets enables said error diffusion process to be carried out at relatively high computational speeds and efficiencies and with a minimum of data storage memory requirements.

10. A method for distributing an error diffusion remainder value, R, into areas surrounding a just-processed super pixel within a larger scan area which includes:

a. storing in memory a plurality of preselected error diffusion sets, with each set having a number of diffusion points with assigned locations and relative weights,
b. selecting one of said error diffusion sets with a profile or contour most closely matching the profile or contour of the developing gray scale profile of a number of previously processed super pixels, and
c. distributing said error remainder R into super pixels adjacent to said just-processed super pixel in accordance with the said contour of the selected error diffusion set.

11. A system for distributing an error diffusion remainder value, R, into areas surrounding a just-processed super pixel within a larger scan area which includes:
a. means for storing in memory a plurality of error diffusion sets, with each set having a number of error diffusion points with assigned locations and relative weights,
b. comparison means connected to said storing means for selecting the one of said error diffusion sets with a profile or contour most closely matching the developing gray scale profile of a number of previously processed super pixels, and
c. means connected to said comparison means for distributing R into areas adjacent to said just-processed super pixel in accordance with the said contour and profile of the selected error diffusion set.

12. A method for distributing an error remainder value into pixels or super pixels adjacent to a just-processed pixel or super pixel, with selected error diffusion-receiving pixels receiving a relative weight value, W, and a diffusion length or location value, L, away from said just-processed pixel or super pixel, which comprises:
a. assigning values of W based upon the gray level intensity of a plurality of selected and previously processed pixels or super pixels, and
b. assigning values of L based upon the slope of the gradient which is generally perpendicular to a family of gray scale contour or profile lines within said previously processed pixels or super pixels.

13. A system for distributing an error remainder value into pixels or super pixels adjacent to a just-processed pixel or super pixel, with selected error diffusion-receiving pixels receiving a relative weight value, W, and a diffusion length or location value, L, away from said just-processed pixel or super pixel, which comprises:
a. means for assigning values of W based upon the gray level intensity of a plurality of selected and previously processed pixels or super pixels, and
b. means for assigning values of L based upon the slope of the gradient which is generally perpendicular to a family of gray scale contour or profile lines within said previously processed pixels or super pixels.

* * * * *